United States Patent
Kuffner, Jr. et al.

(10) Patent No.: US 9,019,268 B1
(45) Date of Patent: Apr. 28, 2015

(54) MODIFICATION OF A THREE-DIMENSIONAL (3D) OBJECT DATA MODEL BASED ON A COMPARISON OF IMAGES AND STATISTICAL INFORMATION

(71) Applicant: Google Inc., Mountain View, CA (US)

(72) Inventors: James J. Kuffner, Jr., Mountain View, CA (US); Anthony Gerald Francis, Jr., San Jose, CA (US); James R. Bruce, Sunnyvale, CA (US); Arshan Poursohi, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/673,390

(22) Filed: Nov. 9, 2012

Related U.S. Application Data (60) Provisional application No. 61/716,074, filed on Oct. 19, 2012.

(51) Int. Cl.
*G06T 15/00* (2011.01)
*G06T 17/00* (2006.01)

(52) U.S. Cl.
CPC ..................................... *G06T 17/00* (2013.01)

(58) Field of Classification Search
None
See application file for complete search history.

(56) References Cited

U.S. PATENT DOCUMENTS

| | | | | |
|---|---|---|---|---|
| 7,460,270 | B2 * | 12/2008 | Stokes et al. | 358/1.9 |
| 7,643,671 | B2 * | 1/2010 | Dong et al. | 382/154 |
| 8,159,694 | B2 * | 4/2012 | Yabe | 358/1.14 |
| 8,538,078 | B2 * | 9/2013 | Berkovich et al. | 382/103 |
| 2003/0085891 | A1 * | 5/2003 | Lyons et al. | 345/420 |
| 2003/0103064 | A1 * | 6/2003 | Knighton et al. | 345/660 |
| 2007/0065002 | A1 * | 3/2007 | Marzell et al. | 382/154 |
| 2009/0153673 | A1 * | 6/2009 | Chu et al. | 348/207.1 |
| 2010/0250201 | A1 * | 9/2010 | Sivovolenko | 703/1 |
| 2012/0176478 | A1 | 7/2012 | Wang et al. | |
| 2012/0177283 | A1 | 7/2012 | Wang et al. | |

OTHER PUBLICATIONS

Autodesk 123D Catch, Catch and carry, Turn ordinary photos into extraordinary 3D models, www.123dapp.com/catch, 2013.

* cited by examiner

*Primary Examiner* — Andrew G Yang
(74) *Attorney, Agent, or Firm* — McDonnell Boehnen Hulbert & Berghoff LLP (57) ABSTRACT

System and methods for rendering three-dimensional (3D) object data models based on a comparison of images. A 3D object data model of an object can be characterized by parameters defining rendering features of the 3D object data model. A comparison can be made of a first rendering of the 3D object data model to one or more reference images related to the object and, based on the comparison, the parameters of the 3D object data model can be modified. Following the modification, the 3D object data model can be rendered to generate a second rendering. Based on the second rendered 3D object data model, statistical information can be obtained and based on the statistical information, the parameters of the 3D object data model can be modified again to further adjust the appearance of the second rendering of the 3D object data model.

20 Claims, 7 Drawing Sheets

MODIFICATION OF A THREE-DIMENSIONAL (3D) OBJECT DATA MODEL BASED ON A COMPARISON OF IMAGES AND STATISTICAL INFORMATION

CROSS-REFERENCE TO RELATED APPLICATIONS

The present non-provisional utility application claims priority under 35 U.S.C. §119(e) to provisional application No. U.S. 61/716,074 filed on Oct. 19, 2012, the entire contents of which are herein incorporated by reference.

FIELD

The present disclosure relates to three-dimensional (3D) object data model rendering, and for example, to methods for modifying a 3D object data model.

BACKGROUND

In computer graphics, three-dimensional (3D) modeling involves generation of a representation of a 3D surface of an object, and the representation may be referred to as a 3D object data model. A 3D object data model can be rendered or displayed as a two-dimensional (2D) image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples. 3D rendering is the 3D computer graphics process of automatically converting 3D object data models into 2D images with 3D photorealistic effects on a computer. The 3D rendering process depicts the 3D object data model as a picture taken from a specified location and perspective. Several different, and often specialized, rendering methods have been developed such as scan-line rendering or ray-tracing, for examples.

Being a collection of data, 3D models can be created by hand, algorithmically, or objects can be scanned, for example. As an example, a given object may be scanned from a number of different angles, and the scanned images can be combined to generate the 3D image of the object. 3D object data models may include solid models that define a volume of the object, or may include shell or boundary models that represent a surface (e.g. the boundary) of the object. Because an appearance of an object depends largely on an exterior of the object, boundary representations are common in computer graphics.

SUMMARY

In one example, a method is provided that includes receiving by a processor a three-dimensional (3D) object data model of an object. The 3D object data model of the object is characterized by parameters defining rendering features for data points of the 3D object data model. The method also includes making a comparison of a first rendering of the 3D Object data model to one or more reference images related to the object. The method includes based on the comparison, modifying one or more of the parameters of the 3D object data model based on an attribute of content in the one or more reference images so as to adjust an appearance of a second rendering of the 3D object data model. The method also includes rendering the 3D object data model based on the modified one or more parameters so as to generate the second rendering. The method includes receiving statistical information associated with the second rendering of the 3D object data model. The statistical information is based on feedback associated with an observation of the second rendering of the 3D object data model. The method also includes based on the statistical information, modifying one or more of the parameters of the 3D object data model to further adjust the appearance of the second rendering of the 3D object data model.

In another example, a system is provided that includes a non-transitory computer-readable medium and program instructions stored on the non-transitory computer-readable medium executable by a computing device to perform the functions of receiving a three-dimensional (3D) data object model of an object. The 3D object data model of the object is characterized by parameters defining rendering features for data points of the 3D object data model. The functions include making a comparison of a first rendering of the 3D object data model to one or more reference images related to the object. The functions also include based on the comparison, modifying one or more of the parameters of the 3D object data model based on an attribute of content in the one or more reference images so as to adjust an appearance of a second rendering of the 3D object data model. The functions include rendering the 3D object data model based on the modified one or more parameters so as to generate the second rendering. The functions include receiving statistical information associated with the second rendering of the 3D object data model. The statistical information is based on feedback associated with an observation of the second rendering of the 3D object data model. The functions also include based on the statistical information, modifying one or more of the parameters of the 3D object data model to further adjust the appearance of the second rendering of the 3D object data model.

In another example, a non-transitory computer readable medium having stored therein program instructions executable by a computing device to cause the computing device to perform functions that include receiving a three-dimensional (3D) object data model of an object is provided. The 3D object data model of the object is characterized by parameters defining rendering features for data points of the 3D object data model. The functions also include making a comparison of a first rendering of the 3D object data model to one or more reference images related to the object. The fi actions include based on the comparison, modifying one or more of the parameters of the 3D object data model based on an attribute of content in the one or more reference images so as to adjust an appearance of a second rendering of the 3D object data model. The functions also include rendering the 3D object data model based on the modified one or more parameters so as to generate the second rendering. The functions include receiving statistical information associated with the second rendering of the 3D object data model. The statistical information is based on feedback associated with an observation of the second, rendering of the 3D object data model. The functions also include based on the statistical information, modifying one or more of the parameters of the 3D object data model to further adjust the appearance of the second rendering of the 3D object data model.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description includes references to the accompanying figures. In the figures, similar symbols typically identify similar components, unless context dictates otherwise. The example embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

This disclosure may disclose, inter alia, methods and systems for rendering three-dimensional (3D) object data models based on a comparison of images. A 3D object data model of an object can be characterized by parameters defining rendering features of the 3D object data model. A comparison can be made to one or more reference images related to the object and, based on the comparison, the parameters of the 3D object data model can be modified. Following the modification, the 3D object data model can be rendered. Based on the rendered 3D object data model, statistical information can be obtained and based on the statistical information, parameters of the 3D object data model can be modified again to further adjust the appearance of the rendering of the 3D object data model.

Figure 1:
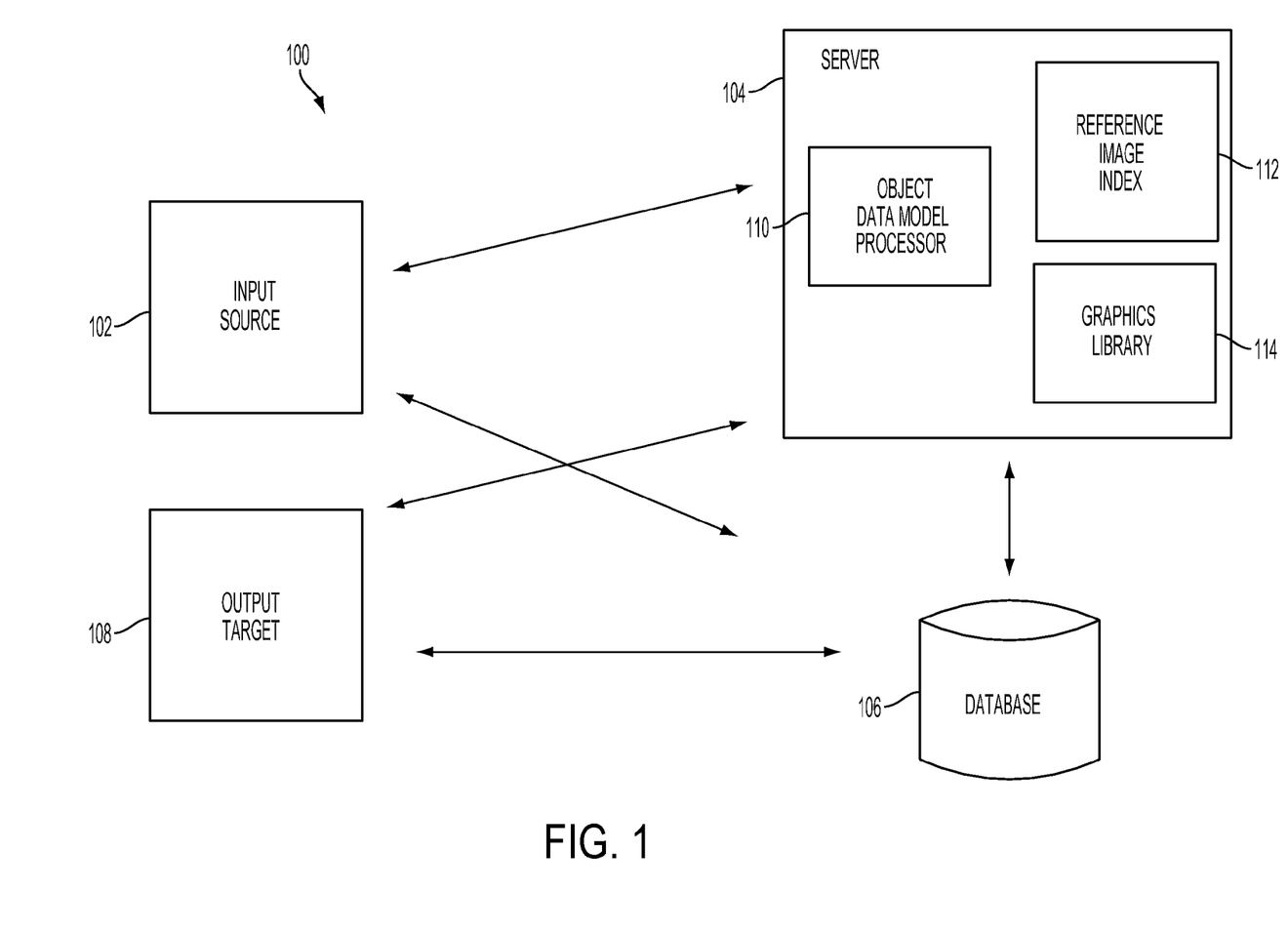
FIG. 1 is a diagram illustrating an example system for rendering three-dimensional (3D) object data models based on a comparison of images, in accordance with embodiments described herein.

Referring now to the figures, FIG. 1 illustrates an example system 100 for rendering 3D object data models based on a comparison of images. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model of an object may be received. In some examples, 3D object data model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution digital single-lens reflex (DSLR) camera may be used to capture images for color texture information. In still other examples, a raw computer-aided drafting (CAD) set of drawings may be received for each object. Thus, the input source 102 may provide a 3D object data model, in various forms to the server 104. As one example, multiple scans of the object may be processed into a merged mesh data model, and provided to the server 104 in that form.

The input source 102 may also be any source from which reference images of the object and statistical information associated with a rendering of the 3D object data model may be received. In some examples, the reference images may be captured with high-resolution DSLR cameras with different lighting conditions from different angles. In other examples, the reference images may also be exported from digital image editing applications. In still other examples, the reference images may be downloaded from image libraries or the Internet. In other examples, statistical information may be captured from a device used to display the rendered 3D object data model. As one example, information indicative of a number of selections of the displayed rendered 3D object data model may be received by the input source 102 and provided to the server 104. Thus, the input source 102 may provide reference images of the object and statistical information associated with a rendering of the 3D object data model, in various forms, to the server 104.

The server 104 includes an object data model processor 110, a reference image index 112, and a graphics library 114. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The object data model processor 110 receives the mesh data model for each object from the input source 102, which may include, for example, a data set defining a surface mesh geometry, and may generate a model of the object in 3D. For example, the object data model processor 110 may perform coherent texture unwrapping from the mesh surface, and determine textures of surfaces emulated from the geometry. In a further example, the object data model processor 110 may receive a previously generated 3D object data model.

The reference image index 112 may receive captured images or processed images that represent or are related to the object on which the 3D object data model is based. For example, for each 3D object data model, the reference image index 112 may receive one or multiple images with varying attributes and may index or label components in the images (e.g., per pixel) as having a certain attributes (i.e., texture, color, shape, lighting, etc.) for the corresponding 3D object data model.

The graphics library 114 may include a WebGL or OpenGL mesh compression to reduce a mesh file size, for example. In other examples, the graphics library 114 may include an Adobe Stage3D or Microsoft Direct3D mesh compression. The graphics library 114 may provide the 3D object data model in a form for display on a browser, for example. In some examples, a 3D object data model viewer may be used to display images of the 3D object data models. The 3D object data model viewer may be implemented using WebGL within a web browser, or OpenGL, for example.

The database 106 may store all data sets for a 3D object data model in any number of various forms from raw data captured to processed data for display. For example, the database 106 may store rendered images of the 3D object data model (shown in FIG. 3C).

The output target 108 may include a number of different targets, such as a webpage on the Internet, a search engine, a database, etc. The output target 108 may include a 3D object data model viewer that enables product advertisements or product searches based on the 3D object data model. In a further example, the output target 108 may include an HTML webpage that displays multiple rendered images of the 3D object data model in the form of advertisements. In operation, for example, the output target 108 may receive from the database 106 the rendered images of the 3D object data model for display on a webpage.

In examples herein, the system 100 may be used to acquire data of an object, process the data to generate a 3D object data model, compare the 3D object data model to multiple images related to the object, modify the data of the 3D object based on the comparison to the multiple images and, based on the modifications, render the 3D object data model for display. Based on the rendered 3D object data model, statistical information can be obtained and, based on the statistical information, the 3D object data model's parameters can be modified again to further adjust the appearance of the rendering of the 3D object data model.

Figure 2:
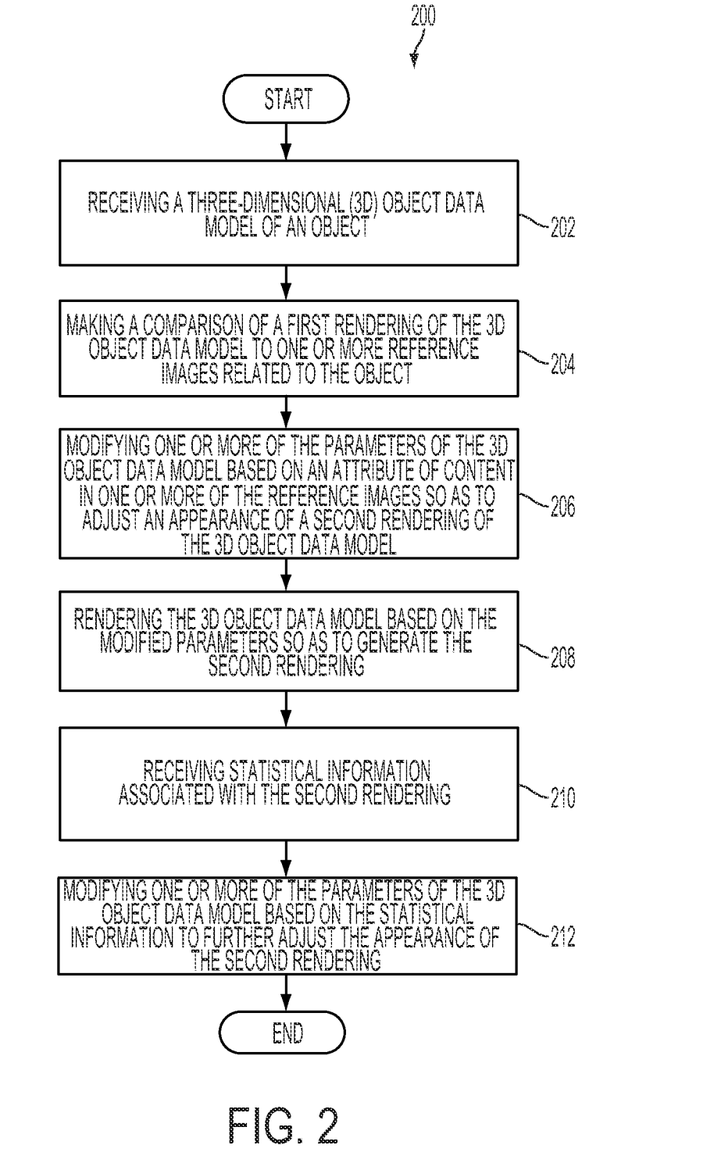
FIG. 2 is a block diagram of an example method for rendering 3D object data models based on a comparison of images, in accordance with embodiments described herein.

FIG. 2 is a block diagram of an example method for rendering a 3D object data model based on a comparison of images. Method 200 shown in FIG. 2 presents an embodiment of a method that, for example, could be used with the system 100, and may be performed by a device, such as any components illustrated in FIG. 1. Method 200 may include one or more operations, functions, or actions as illustrated by one or more of blocks 202-212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium or memory, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

At block 202, the method 200 includes receiving a 3D object data model of an object. A server or other computing device may receive the 3D object data model of the object from a number of sources, such as input by a user, from another server, or database, for example.

The 3D object data model may be characterized by parameters defining rendering features for data points of the 3D object data model. The parameters defining rendering features may include a material attribute, shading, lighting, color, texture, or background. As an example, a user may manually define all of the parameters of a 3D object data model of a smartphone (e.g., the material, lighting, color of the paint, etc.). The 3D object data model may be characterized by parameters defining rendering features for data points of the 3D object data model. In other examples, the 3D object data model may be obtained from available data libraries and previously defined parameters may be associated with the 3D object data model.

At block 204, the method 200 includes making a comparison of a first rendering of the 3D object data model to one or more reference images related to the object. The server 104 may receive one or more images related to the object from a number of sources such as input by a user, from another server, or database. The reference images may depict the object in a number of different manners with varying attributes (e.g., shown in FIG. 3B). Continuing with the example of a smartphone, introduced above, a picture of the smartphone with an attribute of a dim lit environment may be downloaded from a database. In another example, the reference images may comprise product photos that depict the 3D object data in manners a buyer finds appealing. In a further example, a user may digitally edit a picture of the smartphone with an attribute of an enhanced screen. Based on these multiple reference images a comparison can be made between a second rendering of the 3D object data model and the reference images by the object data model processor 110, for example.

At block 206, the method 200 includes modifying one or more of the parameters of the 3D object data model based on an attribute of content in one or more of the reference images so as to adjust an appearance of a second rendering of the 3D object data model. In other words, the parameter of the 3D object data model may be changed knowing that the 3D object data model will be rendered again to incorporate the changes. An attribute of content may include, for example, a given appearance of a given object in the one or more reference images, or an actual appearance of the object in an environment. Based on the comparison of the 3D object data model to the one or more reference images, at block 204, the 3D object data model can be modified accordingly such that the appearance of the second rendering of the 3D object data model reflects an actual appearance of the object in an environment. For instance, the 3D data model of the smartphone can be changed to alter the rendering of the smartphone to depict the enhanced screen attribute. Many methods and techniques exist for modification of 3D data models. For example, a user may manually modify a lighting parameter (e.g., shown in FIG. 3A) of the 3D object data model. In further examples, modification of one or more of the parameters of the 3D object data model can happen by rendering an image of the 3D object data model based on guessed or conjectured parameters and thereafter comparing pixel values of the rendered image and the chosen reference image. For example, the server 104 may receive modified parameters of the 3D object data model that represent what the user believes is an accurate reflection, when rendered, of a reference image in the reference image index 112. Thereafter, the object data model processor 110 may execute instructions to compare pixel values of the rendered 3D object data model and the reference image. Based on this comparison, the parameters of the 3D object data model can be modified to eradicate any differences. In one example, the object data model processor 110 executes program instructions to modify the 3D object data to eradicate the differences.

Once one or more of the parameters has been modified, the 3D object data model can be rendered so as to generate the second rendering. At block 208, the method 200 includes rendering the 3D object data model based on the modified parameters so as to generate the second rendering. Many different and specialized rendering algorithms have been developed such as scan-line rendering or ray-tracing, for example. Ray tracing is a method to produce realistic images by determining visible surfaces in an image at the pixel level. The ray tracing algorithm generates an image by tracing the path of light through pixels in an image plane and simulating the effects of its encounters with virtual objects. Scan-line rendering generates images on a row-by-row basis rather than a pixel-by-pixel basis. All of the polygons representing the 3D object data model are sorted, and then the image is computed using the intersection of a scan line with the polygons as the scan line is advanced down the picture. In one example, the object data model processor 110 may execute instructions to run an application that performs the scan-line rendering algorithm on the 3D object data model. Once the 3D object data model has been rendered, the 3D object model may then be stored in the database 106 and displayed at the output target 108. In some examples, the rendered 3D object data model may be rendered in an electronic document. In other examples, a plurality of renderings of the 3D object data model may be provided to the database 106. Any rendering algorithm may be used by the processor 110 to render the 3D data object model.

At block 210, the method 200 includes receive statistical information associated with the second rendering of the 3D object data model. Within the context of this disclosure, statistical information may include any information indicative of satisfaction or dissatisfaction of the rendering of the 3D object data model. For example, a user may be presented with a rendering of the 3D object data model (e.g., shown in FIG. 3C) at the output target 108, in the form of an electronic document in a HTML webpage and queried whether the rendering is satisfactory. A user can indicate satisfaction, for example, with a mouse click action. Based on such user activity statistical information can be developed. For example, the number of mouse click actions can be determined and sent to the server 104. In one example, the user may receive a second rendering and the original reference images or other desired reference photography. The user may then select the preferable image. In a further example, a user may receive multiple renderings for display on an electronic device, which are juxtaposed to one another, and thereafter select one, preferable rendering of the multiple renderings of the 3D object data model sending this information to the server 104.

In another example, a user may be presented with a rendering of the 3D object data model at the output target 108 without being queried whether the rendering is satisfactory. Statistical information can still be obtained. For example, a user may view the HTML webpage at the output target 108 depicting a preferable rendering of the 3D object data model for a period of time that is longer than the user views a HTML webpage depicting a non-preferable rendered 3D object data model. In another example, the user may be presented with a HTML hyperlink at the output target 108 depicting a rendering of the 3D object data model and may select the hyperlink to purchase the object depicted in the rendering. Based on such user activity statistical information can be developed. All of this statistical information can be obtained by the input source 102 and sent to the server 104.

In a further example, statistical information that describes differences between the rendering of the 3D object data model and the reference images may be obtained. For example, a user may be presented with a particular rendering and the original reference image and/or any other desired reference image. When the user selects a particular image from the group of images (including the rendered 3D object data model), statistical information may be obtained that describes differences between the chosen image and the other images. Such statistical information may include, for example, a number of different pixels, a number of pixels with a different color or different shading, a difference in the size of a figure depicted in the renderings, a difference in a background depicted in the renderings, or a difference in the shape of a figure depicted in the renderings. Other statistical information that describes differences may be determined. In other examples, the statistical information may include rendering angles at which the rendered 3D object data model has greater or lesser differences based on one or more of the aforementioned variables.

At block 212, the method 200 includes modifying one or more of the parameters of the 3D object data model based on the statistical information to further adjust the appearance of the second rendering. To do so, may include adjusting the appearance of the second rendering of the 3D object data model to illustrate edits that modify an actual appearance of the object in an environment. For example, if a user repetitively ignores the smartphone in white (shown in FIG. 3C), e.g., does not click the rendering in white sixty percent of the time, then the parameters of the 3D object data model representing the smartphone may be modified to apply a different color to the smartphone. In other examples, parameters of the 3D object data model may be changed to: cause certain pixels to change color, cause the texture of the 3D object model to change, adjust the geometry of the 3D object model, adjust the material of a point or patch on the 3D object model, or alter or tweak the shading applied to the 3D model. Some or all of the statistical information received by the server 104 may be used to modify the one or more parameters of the 3D object data model at block 212 in method 200. In one example, the color parameter of the 3D object data model (i.e., the smartphone) is manually changed via the input source 102 and the modified 3D object data model is sent to the object data model processor 110 in the server 104 to generate a rendering of the 3D object data model. Alternatively, the color parameter, or any other parameter may be automatically modified based on the statistical information using data processor 110, for example.

Figure 3A:
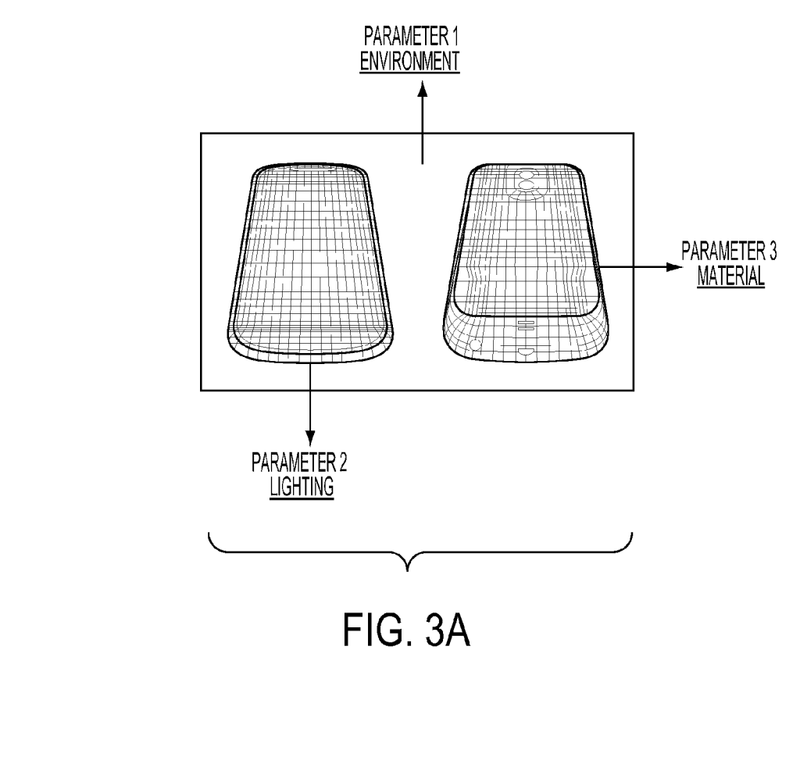
FIGS. 3A-3D conceptually illustrate examples of rendering a 3D object data model based on a comparison of images, in accordance with embodiments described herein.

FIGS. 3A-3D conceptually illustrate examples of receiving a 3D object data model of an object, comparing the 3D object data model to multiple reference images of the object, modifying parameters of the 3D object data model that define rendering features for data points on the 3D object data model, and rendering the 3D object data model to match an appearance of the object in one or more of the multiple reference images. FIG. 3A illustrates a 3D object data model of a smartphone. The 3D object data model includes parameters defining rendering features for data points of the 3D object data model. For example, parameters may include environment, lighting, or material.

Figure 3B:
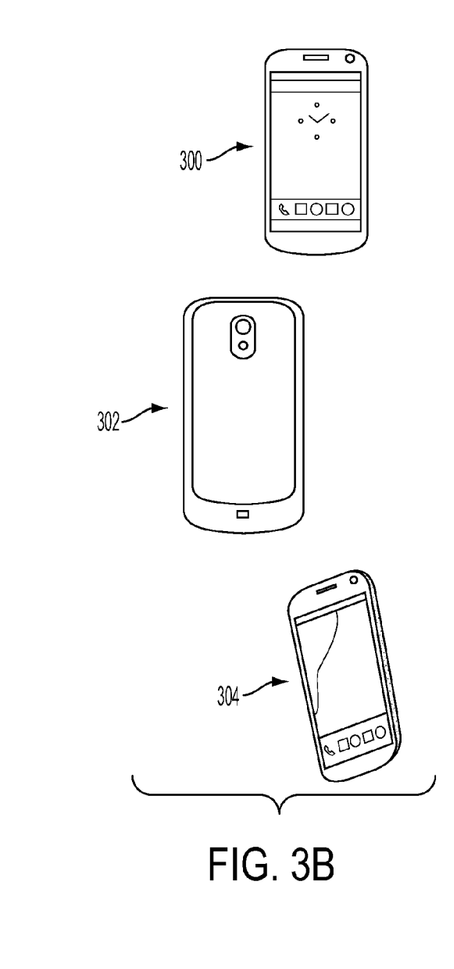

FIG. 3B illustrates multiple reference images of the smartphone. As shown each of the reference images, 300-304, depict the smartphone with varying attributes of content. For example, smartphone 300 includes a front view of the smartphone in white, while smartphone 302 depicts the back of the smartphone. Smartphone 304 depicts the smartphone in black with a light-enhanced screen being held by a hand and tilted. In these figures, for example, a lighting attribute, which can be used to define the lighting parameter of the 3D object data model, is varied. Other attributes may also be varied.

Figure 3C:
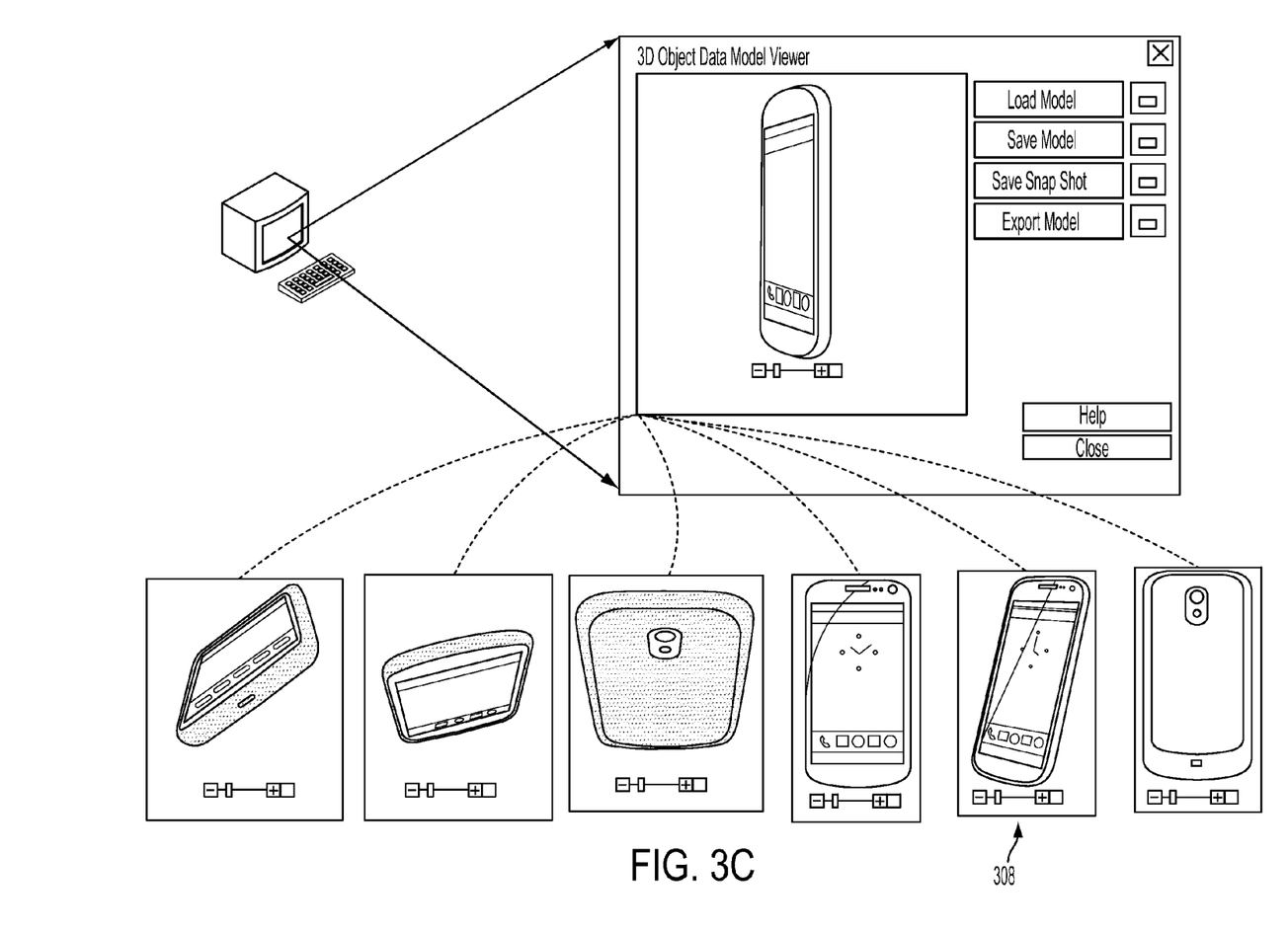

FIG. 3C illustrates examples of various renderings of the 3D object data model (the smartphone). The renderings are may be viewed in a 3D object data model viewer at the output target 108, for example. As shown, each of the renderings is based on the comparison to the reference images. For example, rendering 308 is of the smartphone tilted, with white paint, with a light-enhanced screen, incorporating, for example, the color attribute as shown in reference image 300, and the lighting attribute as shown in reference image 304 in FIG. 3B. The various renderings of the 3D object data model may include all or some of the reference figure attributes.

Figure 3D:
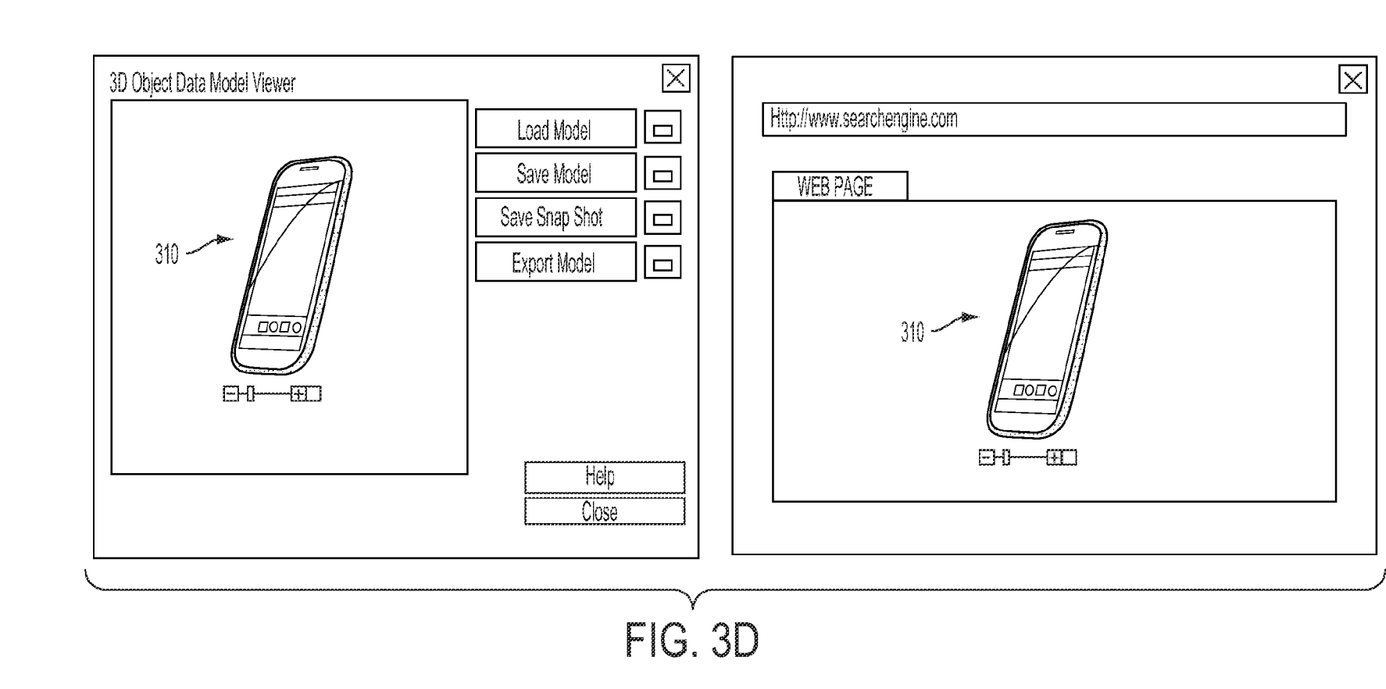

FIG. 3D illustrates an example of a rendering, in a 3D object data model viewer or a HTML web page, for example, of the 3D object data model that has been further adjusted based on statistical information. As shown, the rendered smartphone 310 does not show the smartphone in white as depicted in rendered smartphone 308 (shown in FIG. 3C) because the statistical information received by the server 104—received in any manner discussed with reference to step 210 in method 200, for example—indicated a preference for a smartphone in black, for example.

Figure 4:
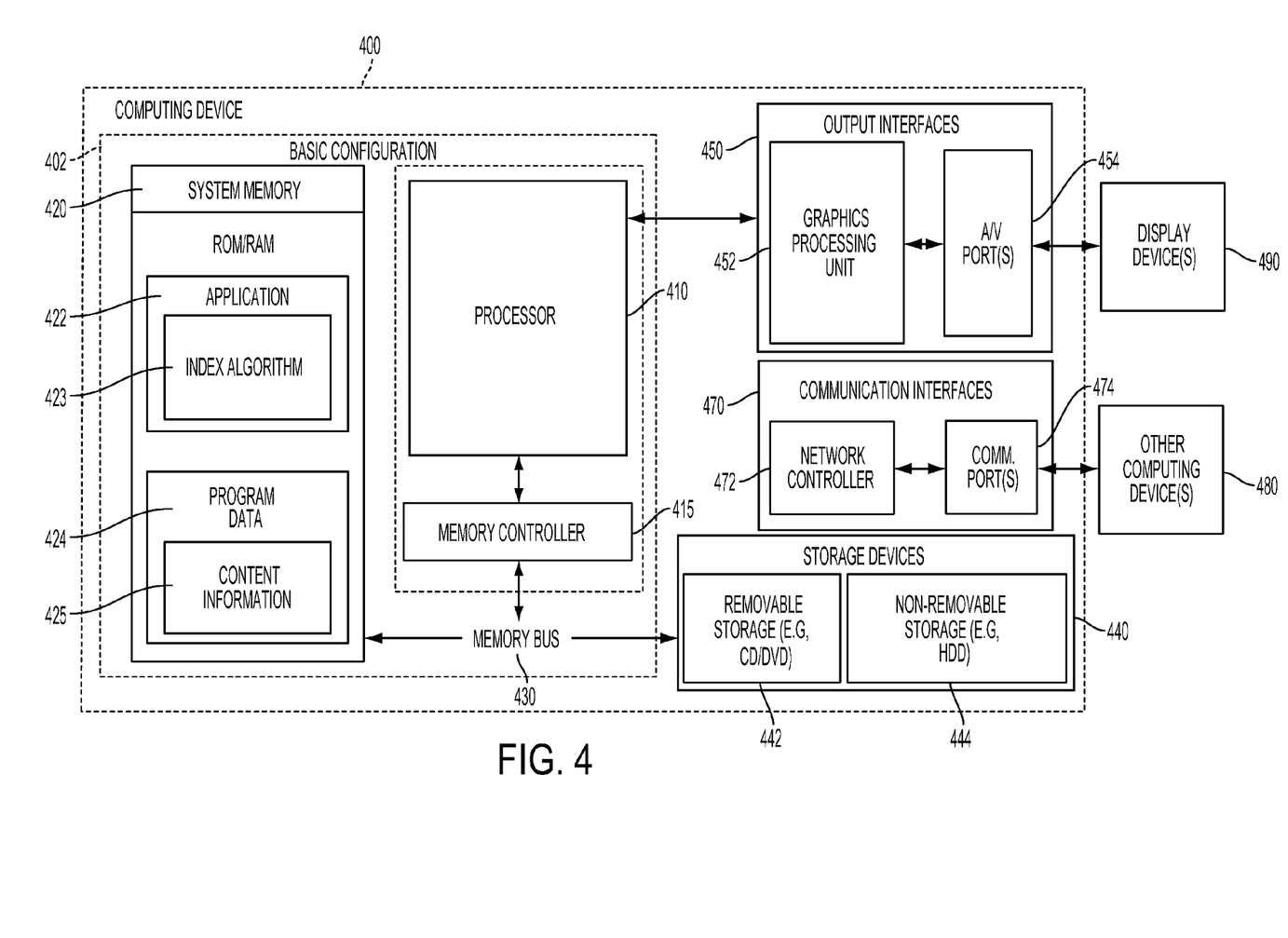
FIG. 4 is a functional block diagram illustrating an example computing device used in a computing system, in accordance with embodiments described herein.

FIG. 4 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for interacting with 3D object data models as described in FIGS. 1-3. In a basic configuration 402, computing device 400 may typically include one or more processors 410 and system memory 420. A memory bus 430 can be used for communicating between the processor 410 and the system memory 420. Depending on the desired configuration, processor 410 can be of any type including but not limited to a microprocessor (µP), a microcontroller (µC), a digital signal processor (DSP), or any combination thereof. A memory controller 415 can also be used with the processor 410, or in some implementations, the memory controller 415 can be an internal part of the processor 410.

Depending on the desired configuration, the system memory 420 can be of any type including but not limited to volatile memory (such as RAM), non-volatile memory (such as ROM, flash memory, etc.) or any combination thereof. System memory 420 may include one or more applications 422, and program data 424. Application 422 may include an index algorithm 423 that is arranged to provide inputs to the electronic circuits, in accordance with the present disclosure. Program data 424 may include content information 425 that could be directed to any number of types of data. In some example embodiments, application 422 can be arranged to operate with program data 424 on an operating system.

Computing device 400 can have additional features or functionality, and additional interfaces to facilitate communications between the basic configuration 402 and any devices and interfaces. For example, data storage devices 440 can be provided including removable storage devices 442, non-removable storage devices 444, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 420 and storage devices 440 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 400.

Computing device 400 can also include output interfaces 450 that may include a graphics processing unit 452, which can be configured to communicate to various external devices such as display devices 490 or speakers via one or more A/V ports or a communication interface 470. The communication interface 470 may include a network controller 472, which can be arranged to facilitate communications with one or more other computing devices 480 over a network communication via one or more communication ports 474. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

Figure 5:
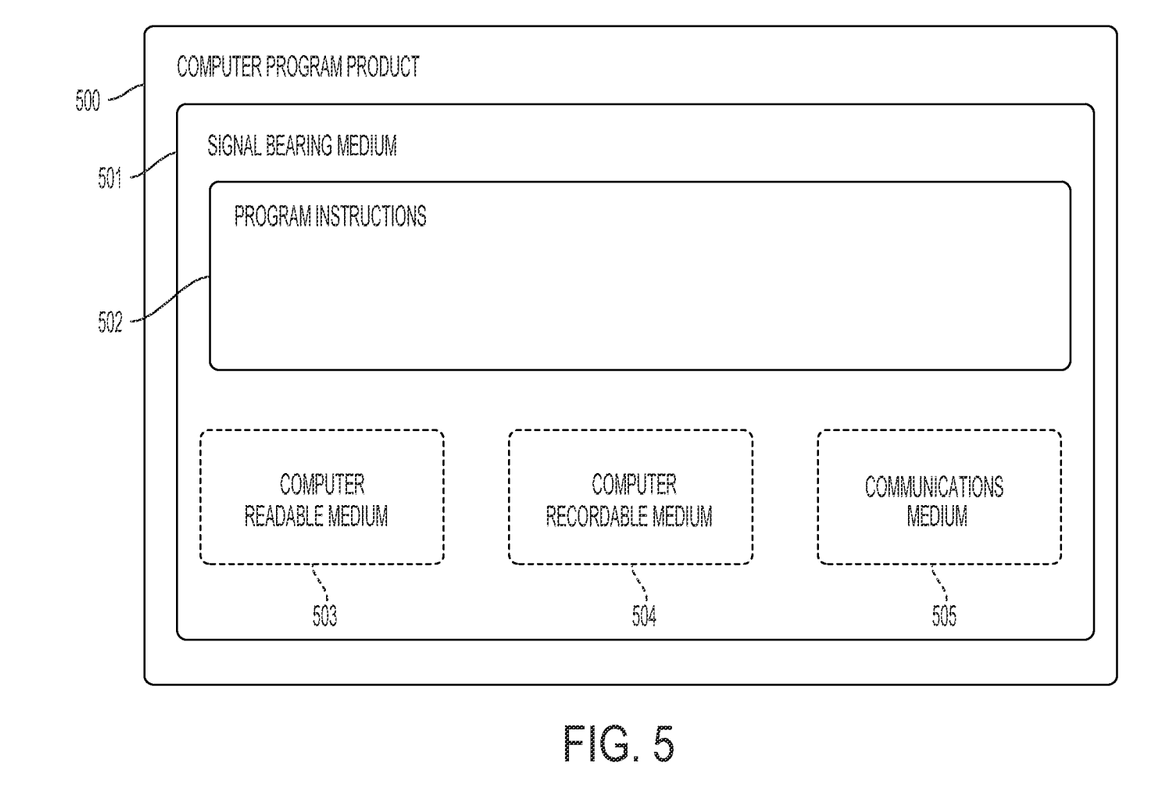
FIG. 5 is a schematic illustrating a conceptual partial view of an example computer program product that includes a computer program for executing a computer process on a computing device, in accordance with embodiments described herein

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 501. The signal bearing medium 501 may include one or more programming instructions 502 that, when executed by one or more processors may provide functionality or portions of the functionality described above with respect to FIGS. 1-3. In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming with the IEEE 802.11 standard or other transmission protocol).

The one or more programming instructions 502 may be, for example, computer executable and/or logic implemented instructions. In some examples, a computing device such as the computing device 400 of FIG. 4 may be configured to provide various operations, functions, or actions in response to the programming instructions 502 conveyed to the computing device 500 by one or more of the computer readable medium 503, the computer recordable medium 504, and/or the communications medium 505.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
  receiving, by one or more processors, a three-dimensional (3D) object data model of an object in an environment, wherein the 3D object data model of the object is characterized by parameters defining rendering features for data points of the 3D object data model;
  receiving, by the one or more processors, multiple reference images depicting other distinct occurrences of the object in a different environment, wherein each of the multiple reference images depicting the other distinct occurrences of the object includes at least one attribute of content associated with the object different from attributes of content of the other reference images;
  making a comparison, by the one or more processors, of a first rendering of the 3D object data model to the multiple reference images of the other occurrences of the object;
  based on the comparison, making a plurality of respective different modifications, by the one or more processors, to one or more of the parameters of the 3D object data model, each modification being based on least one attribute of content from the multiple reference images so as to produce a distinct appearance of a respective secondary rendering of the 3D object data model;
  rendering, by the one or more processors, the 3D object data model based on the plurality of respective different modifications so as to generate a plurality of different secondary renderings of the 3D object data model that correspond to respective modifications of the plurality of respective different modifications and that depict the object in a configuration incorporating at least one attribute of content from the multiple reference images of the object;
  receiving, by the one or more processors, statistical information indicative of whether the plurality of different secondary renderings of the 3D object data model are satisfactory, wherein the statistical information is based on feedback associated with an observation of the plurality of different secondary renderings of the 3D object data model; and
  based on the statistical information indicating that a given secondary rendering of the plurality of different secondary renderings of the 3D object data model is satisfactory, the one or more processors (i) making a subsequent modification to one or more of the parameters of the 3D object data model, and (ii) rendering the 3D object data model based on the subsequent modification so as to generate a subsequent rendering that includes at least a portion of parameters of the 3D object data model as rendered in the given secondary rendering.

2. The method of claim 1, further comprising:
  providing the plurality of different secondary renderings of the 3D object data model for display within an electronic document, wherein the plurality of different secondary renderings are displayed juxtaposed to one another, and wherein receiving the statistical information comprises receiving information associated with each of the plurality of different secondary renderings that is indicative of a number of selections of the secondary rendering within the electronic document.

3. The method of claim 1, wherein the 3D object data model is based on a compilation of scans of the object in the environment, and wherein making the plurality of respective different modifications, each modification being based on the at least one attribute of content from the multiple reference images so as to produce the distinct appearance of the respective secondary rendering of the 3D object data model comprises making at least one modification so as to produce a distinct appearance of at least one respective secondary rendering of the 3D object data model that matches an actual appearance of the scanned object in the environment.

4. The method of claim 1, wherein making the plurality of respective different modifications, each modification being based on the at least one attribute of content from the multiple reference images so as to produce the distinct appearance of the respective secondary rendering of the 3D object data model comprises making at least one modification so as to produce a distinct appearance of at least one respective secondary rendering of the 3D object data model that matches a given appearance of a given object depicted in a respective reference image of the multiple reference images.

5. The method of claim 1, wherein making the subsequent modification to one or more of the parameters of the 3D object data model comprises making the subsequent modification to one or more of the parameters of the 3D object data model so as to produce an appearance of the subsequent rendering that illustrates edits that modify an actual appearance of the object in the environment.

6. The method of claim 1, wherein rendering the 3D object data model based on the plurality of respective different modifications so as to generate the plurality of different secondary renderings comprises rendering the 3D object data model so as to generate the plurality of different secondary renderings for display on an electronic device.

7. The method of claim 1, wherein the rendering features for data points of the 3D object data model include a material of the object in the environment,
  wherein the at least one attribute of content associated with the object depicted in each of the multiple reference images includes a material of the object depicted in each of the multiple reference images, and
  wherein making the plurality of respective different modifications to one or more of the parameters of the 3D object data model comprises making the plurality of respective different modifications based at least in part on the material of the object depicted in each of the multiple reference images.

8. The method of claim 1, wherein the rendering features for data points of the 3D object data model include at least one color of the object in the environment,
  wherein the at least one attribute of content associated with the object depicted in each of the multiple reference images includes at least one color of the object depicted in each of the multiple reference images, and
  wherein making the plurality of respective different modifications to one or more of the parameters of the 3D object data model comprises making the plurality of respective different modifications based at least in part on the at least one color of the object depicted in each of the multiple reference images.

9. The method of claim 1, wherein the rendering features for data points of the 3D object data model include a lighting of the object in the environment,
  wherein the at least one attribute of content associated with the object depicted in each of the multiple reference images includes a lighting of the object depicted in each of the multiple reference images, and
  wherein making the plurality of respective different modifications to one or more of the parameters of the 3D object data model comprises making the plurality of respective different modifications based at least in part on the lighting of the object depicted in each of the multiple reference images.

10. A system comprising:
  a non-transitory computer-readable medium; and
  program instructions stored on the non-transitory computer-readable medium executable by one or more computing devices to perform the functions of:
    receiving a three-dimensional (3D) object data model of an object in an environment, wherein the 3D object data model of the object is characterized by parameters defining rendering features for data points of the 3D object data model;
    receiving multiple reference images depicting other distinct occurrences of the object in a different environment, wherein each of the multiple reference images depicting the other distinct occurrences of the object includes at least one attribute of content associated with the object different from attributes of content of the other reference images;
    making a comparison of a first rendering of the 3D object data model to the multiple reference images of the other occurrences of the object;
    based on the comparison, making a plurality of respective different modifications to one or more of the parameters of the 3D object data model, each modification being based on at least one attribute of content from the multiple reference images so as to produce a distinct appearance of a respective secondary rendering of the 3D object data model;
    rendering the 3D object data model based on the plurality of respective different modifications so as to generate a plurality of different secondary renderings of the 3D object data model that correspond to respective modifications of the plurality of respective different modifications and that depict the object in a configuration incorporating at least one attribute of content from the multiple reference images of the object;
    receiving statistical information indicative of whether the plurality of different secondary renderings of the 3D object data model are satisfactory, wherein the statistical information is based on feedback associated with an observation of the plurality of different secondary renderings of the 3D object data model; and
    based on the statistical information indicating that a given secondary rendering of the plurality of different secondary renderings of the 3D object data model is satisfactory, (i) making a subsequent modification to one or more of the parameters of the 3D object data model, and (ii) rendering the 3D object data model based on the subsequent modification so as to generate a subsequent rendering that includes at least a portion of parameters of the 3D object data model as rendered in the given secondary rendering.

11. The system of claim 10, wherein the rendering features for data points of the 3D object data model include one or more of a material attribute, a color of the material attribute, a texture, and a background, and
  wherein the at least one attribute of content associated with the object depicted in each of the multiple reference images includes one or more of a material of the object depicted in each of the multiple reference images, a color of the material of the object depicted in each of the multiple reference images, a texture of the object depicted in each of the multiple reference images, and a background behind the object in the image in which the object is depicted.

12. The system of claim 10, wherein rendering the 3D object data model based on the plurality of respective different modifications so as to generate the plurality of different secondary renderings comprises:
  rendering the 3D object data model within an electronic document for display, and
  providing the plurality of different secondary renderings of the 3D object data model for display within the electronic document, wherein the plurality of different secondary renderings are displayed juxtaposed to one another,
  wherein receiving the statistical information comprises one or more of receiving information associated with each of the plurality of different secondary renderings that is indicative of a number of selections of the secondary rendering within the electronic document, and receiving information associated with each of the plurality of different secondary renderings that is indicative of whether the secondary rendering is satisfactory.

13. The system of claim 10, wherein the 3D object data model is based on a compilation of scans of the object in the environment, and wherein making the plurality of respective different modifications, each modification being based on the at least one attribute of content from the multiple reference images so as to produce the distinct appearance of the respective secondary rendering of the 3D object data model comprises one or more of:
    making at least one modification so as to produce a distinct appearance of at least one respective secondary rendering of the 3D object data model that matches an actual appearance of the scanned object in the environment, and
    making at least one modification so as to produce a distinct appearance of at least one respective secondary rendering of the 3D object data model that matches a given appearance of a given object depicted in a respective reference image of the multiple reference images.

14. The system of claim 10, wherein making the subsequent modification to one or more of the parameters of the 3D object data model comprises making the subsequent modification to one or more of the parameters of the 3D object data model so as to produce an appearance of the subsequent rendering that illustrates edits that modify an actual appearance of the object in the environment.

15. The system of claim 10, wherein rendering the 3D object data model based on the plurality of respective different modifications so as to generate the plurality of different secondary renderings comprises rendering the 3D object data model so as to generate the plurality of different secondary renderings for display on an electronic device.

16. A non-transitory computer-readable medium having stored therein program instructions executable by one or more computing devices to cause the one or more computing devices to perform functions comprising:
    receiving a three-dimensional (3D) object data model of an object in an environment, wherein the 3D object data model of the object is characterized by parameters defining rendering features for data points of the 3D object data model;
    receiving multiple reference images depicting other distinct occurrences of the object in a different environment, wherein each of the multiple reference images depicting the other distinct occurrences of the object includes at least one attribute of content associated with the object different from attributes of content of the other reference images;
    making a comparison of a first rendering of the 3D object data model to the multiple reference images of the other occurrences of the object;
    based on the comparison, making a plurality of respective different modifications to one or more of the parameters of the 3D object data model, each modification being based on at least one attribute of content from the multiple reference images so as to produce a distinct appearance of a respective secondary rendering of the 3D object data model;
    rendering the 3D object data model based on the plurality of respective different modifications so as to generate a plurality of different secondary renderings of the 3D object data model that correspond to respective modifications of the plurality of respective different modifications and that depict the object in a configuration incorporating at least one attribute of content from the multiple reference images of the object;
    receiving statistical information indicative of whether the plurality of different secondary renderings of the 3D object data model are satisfactory, wherein the statistical information is based on feedback associated with an observation of the plurality of different secondary renderings of the 3D object data model; and
    based on the statistical information indicating that a given secondary rendering of the plurality of different secondary renderings of the 3D object data model is satisfactory, (i) making a subsequent modification to one or more of the parameters of the 3D object data model, and (ii) rendering the 3D object data model based on the subsequent modification so as to generate a subsequent rendering that includes at least a portion of parameters of the 3D object data model as rendered in the given secondary rendering.

17. The non-transitory computer readable medium of claim 16, wherein the rendering features for data points of the 3D object data model include one or more of a material attribute, a shading, a lighting, a color, a texture, and a background.

18. The non-transitory computer readable medium of claim 16, wherein the program instructions are further executable by the one or more computing devices to cause the one or more computing devices to perform functions comprising:
    rendering the 3D object data model within an electronic document for display, and
    providing the plurality of different secondary renderings of the 3D object data model for display within the electronic document, wherein the plurality of different secondary renderings are displayed juxtaposed to one another,
    wherein the one or more computing devices, when receiving the statistical information comprises one or more of receiving information associated with each of the plurality of different secondary renderings that is indicative of a number of selections of the secondary rendering within the electronic document, and information associated with each of the plurality of different secondary renderings that is indicative of whether the secondary rendering is satisfactory.

19. The non-transitory computer readable medium of claim 16, wherein:
    the 3D object data model is based on a compilation of scans of the object in the environment; and
    the program instructions are further executable by the one or more computing devices to cause the one or more computing devices to perform functions comprising:
        making at least one modification to one or more of the parameters of the 3D object data model so as to produce a distinct appearance of at least one respective secondary rendering of the 3D object data model that matches an actual appearance of the scanned object in the environment, and
        making at least one modification to one or more of the parameters of the 3D object data model so as to produce a distinct appearance of at least one respective secondary rendering of the 3D object data model that matches a given appearance of a given object depicted in a respective reference image of the multiple reference images.

20. The non-transitory computer readable medium of claim 16, wherein the program instructions are further executable by the one or more computing devices to cause the one or more computing devices to perform functions comprising:

making the subsequent modification to one or more of the parameters of the 3D object data model so as to produce an appearance of the subsequent rendering that illustrates edits that modify an actual appearance of the object in the environment.

* * * * *